Jan. 3, 1950  R. C. GADDIS ET AL  2,493,451
CONVEYER STRUCTURE
Filed April 2, 1948
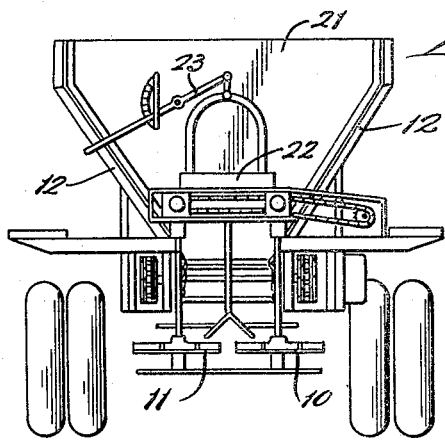
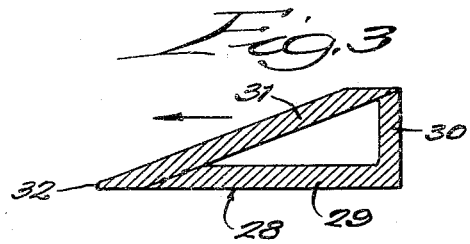
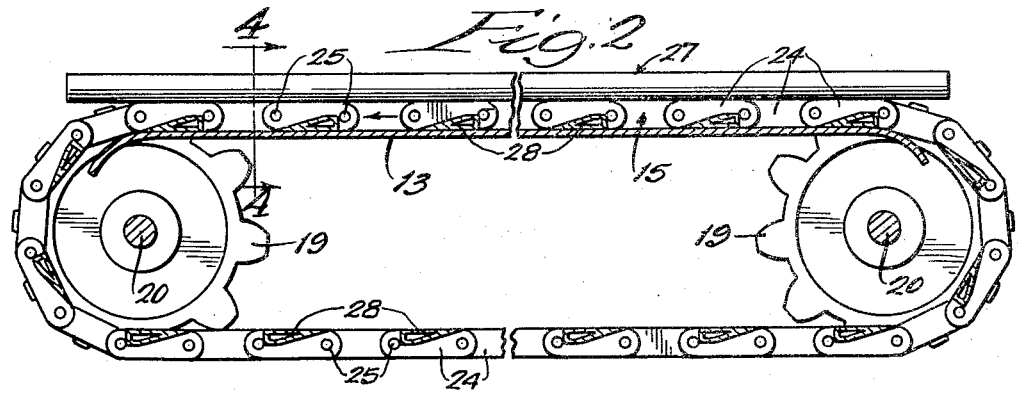
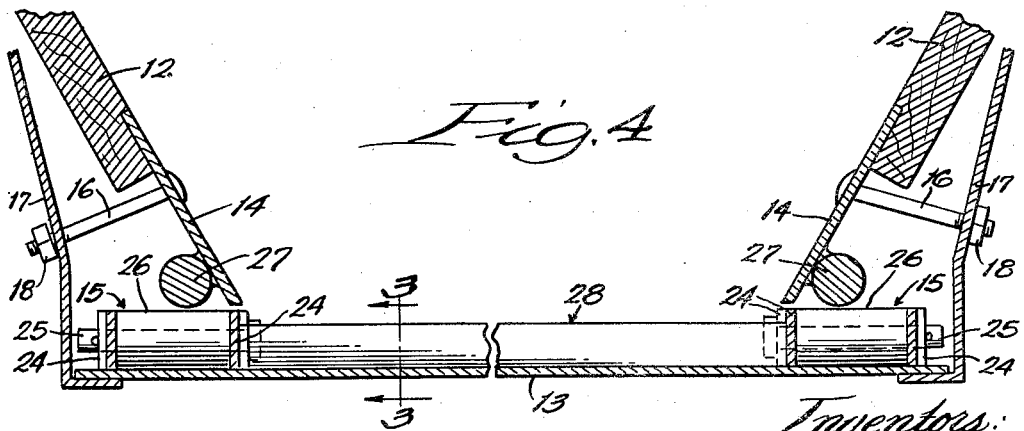
Inventors:
Roy C. Gaddis and
Luther Ray Gann,
By Dawson, Ooms, Booth and Spangenberg,
Attorneys.

Patented Jan. 3, 1950

2,493,451

UNITED STATES PATENT OFFICE 2,493,451

CONVEYER STRUCTURE

Roy C. Gaddis, Cedar Rapids, Iowa, and Luther Ray Gann, Higginsville, Mo.; said Gann assignor to said Gaddis Application April 2, 1948, Serial No. 18,614

4 Claims. (Cl. 214—83.36)

This invention relates to conveyor structure useful for discharging granular material or for spreading the same. The invention is particularly useful in connection with a lime spreader, or other type of vehicle, equipped with unloading conveyor chains, etc.

In lime spreaders and in vehicles equipped with unloader chains having blades or crossbars between them, it has been the practice to equip the inwardly and downwardly inclined side walls of the vehicle with strips of metal forming shields, which engage the conveyor chains or bars and prevent them from rising when the bars or blades strike obstacles on the bed of the vehicle. As the conveyor blades or cross-bars move along the bed of the vehicle to feed lime or other material toward the outlet end of the vehicle, obstacles of various thicknesses, such as rock, limestone, and other hard particles, tend to get under the blades or bars and to raise them up. As the bars are raised slightly, larger particles get under them and continue the upper pressure against the bars. Thus tremendous binding force is brought against the lower edge of the shield and the metal tends to wear away, while at the same time also wearing away the edge portion of the chain conveyor. The foregoing difficulties shorten the life of the unloaders or spreaders, while at the same time preventing smooth and even operation of the structures and often resulting in breakages during operation.

An object of the present invention is to provide a structure which obviates the above difficulties and provides a smooth working mechanism of long life and one that avoids breakages. A still further object is to provide a structure which requires less horse power for operation and one which provides a definite cleaning effect for the blades or cross-bars. Yet another object is to provide a structure in which the rollers of the roller chain links are brought into effective operation with a pressure rod structure, whereby friction and wear are greatly reduced, while producing a more easily operated conveyor structure. A still further object is to provide cross-bars which may be operated with less power because of an inclined face construction, causing them to scoop under obstacles rather than sliding over the top of them. Yet another object is to provide a cross-bar structure of unique configuration, which greatly reduces the force required to move the conveyor, because the structure tends to cling to the bed of the vehicle by virtue of the inclined edge of the cross-bar, while at the same time effectively feeding material toward the outlet of the vehicle. Other specific objects and advantages will appear as the specification proceeds.

The invention is illustrated, in a single embodiment, by the accompanying drawing, in which—

Figure 1 is a rear view in elevation of a lime spreader equipped with apparatus embodying my invention; Fig. 2, an enlarged broken vertical sectional view of conveyor apparatus employed; Fig. 3, an enlarged transverse sectional view of a cross-bar which may be employed; and Fig. 4, a broken enlarged transverse sectional view, the section being taken as indicated at line 4 of Fig. 2.

The lime spreader illustrated in Fig. 1 is merely illustrative of a number of types of vehicles with which the present invention may be employed. In the lime spreader, lime is fed rearwardly by continuous conveyor chains, having blades or cross-bars extending between them, and the lime is discharged downwardly upon rotating disks, which distribute the lime laterally. In the specific illustration given, the rotating disks are indicated by the numerals 10 and 11. The present invention, however, is not concerned with the distributing of material, but rather with the feeding of material along the bed of a conveyor to a discharge point at one end.

It is sufficient for the purpose of the present invention to point out that the vehicle is provided with inclined side walls 12, which move inwardly and downwardly toward the bed 13. The side walls are provided with metal shields 14, which provide, in effect, a continuation of the side walls and extend over roller conveyor chains 15. Bolts 16 extend between the shields 14 and the fixed flange 17, as shown more clearly in Fig. 4. The bolts are provided with nuts 18, which may be tightened to spring inwardly the shields 14.

The roller chain conveyors are continuous, extending on opposite sides of the bed, and are carried by sprockets 19 mounted on shafts 20. At least one of the shafts is driven by motor so as to propel the conveyor chains with the upper flight thereof, which rests upon the bed 13, moving toward the outlet end of the vehicle.

The outlet end of the vehicle is closed by a wall 21, having a discharge opening therein controlled by a slideably-mounted door 22. The door 22 may be raised by a lever 23 to open the end of the vehicle and to permit the chains thereof to discharge lime or other material through the opening in the rear wall of the vehicle.

The chain conveyor 15 is the usual type of roller chain structure, consisting of pivotally-connecting links 24 connected together by pins 25 and rollers 26.

In the carrying out of our invention, we provide a bar 27, which is welded or otherwise secured to the inner side of each shield 14, so as to engage a central or intermediate portion of the rollers 26 therebelow. Preferably, the bar 27 is in the shape of a round rod, as indicated in Figs. 2 and 4.

As a further important part of the conveyor, we provide cross-bars 28 having the cross-sectional configuration indicated best in Figs. 2 and 3. In the structure shown, we provide an angle iron member having a relatively long lower leg 29 and a relatively short leg 30. To the inclined outer faces of the legs 29 and 30, there is welded a metal strip 31, forming an inclined outer face leading downwardly and forwardly to the point 32. It will be understood that the structure may be formed in different ways to give the structure having the inclined working face, as illustrated. The angle iron and flat strip structure shown, however, is particularly sturdy and effective for the uses described.

*Operation*

In the operation of the structure, the conveyor chains are put into operation in the usual way, and the cross-bars 28, which are welded or otherwise secured at their inner ends to the links 24, are carried by the chains forwardly against the bed 13 of the vehicle, as shown more clearly in Figs. 2 and 4. Any tendency of the bars 28 to move upwardly is prevented by contact between the rods 27 and the rollers 26. The upper thrust of the cross-bars is transmitted through the rollers 26 against the rods 27, whereby the rollers become effective in preventing wedging action and the wearing of the parts. At the same time, we find that, as the bars 28 are moved forwardly against the lime, rock, or other material, the inclined upper face of the strip 31 in striking the material tends to depress the point 32 and to keep it against the bed of the vehicle. In other words, the weight of the material being moved is effective in holding the cross-bar against the bottom of the bed.

The action is very much the same as where a scoop shovel is inserted under material along the smooth side of a bed. The force required to move the shovel under the material is very slight compared with the force required to move the shovel into the material body at a point above the bed. Here, by keeping the forward point of the cross-bar closely in contact with the bed of the vehicle, the flights or cross-bars are moved easily under the material, while at the same time advancing the material toward the outlet opening.

The rod and roller structure illustrated results in a minimum of wear and even if the slightest wear does result, the bolts 16 and nuts 18 permit the rods 27 to be drawn inwardly to take up the space so that the rollers are again held tightly against the bed of the vehicle.

As already stated, the apparatus illustrated may be employed with any type of vehicle which employs feeding or unloading conveyor mechanism and is not limited to the use of the lime spreader illustrated, which distributes the lime which is unloaded by the mechanism from the vehicle. It will also be understood that the invention is applicable to conveyors installed in stationary structures, etc.

While, in the foregoing specification, we have shown a specific embodiment illustrating our invention in great detail, it will be understood that the details of structure may be modified widely by those skilled in the art without departing from the spirit of our invention.

We claim:

1. In combination with a vehicle body having a bed flanked by continuous roller chain conveyors with cross-bars therebetween and having also inwardly and downwardly inclined side walls, shields forming extensions of said side walls and extending inwardly of said roller chains, metal rods welded to the walls of said shields and bearing against the rollers of said conveyors, and means for drawing said shields outwardly to bring said rods adjustably against said rollers.

2. In an unloader structure having a bed and inwardly and downwardly inclined side walls and having also said bed flanked with continuous conveyor chains equipped with rollers, cross-bars secured to said conveyor chains and extending across said bed, said cross-bars being of triangular cross-section and having a top wall inclined downwardly and forwardly to a point adjacent said bed, and rods supported by said side walls and having lower rounded surfaces engaging the rollers of said conveyor chains.

3. In an unloader structure having a bed and inwardly and downwardly inclined side walls and having also said bed flanked with continuous conveyor chains equipped with rollers, cross-bars secured to said conveyor chains and extending across said bed, and rods supported by said side walls and having lower rounded surfaces engaging the rollers of said conveyor chains.

4. In combination with a vehicle body having a bed flanked by continuous roller chain conveyors with cross-bars therebetween and having also inwardly and downwardly inclined side walls, said cross-bars being of triangular cross section and having a top wall inclined downwardly and forwardly to a point adjacent said bed, shields forming extensions of said side walls and extending inwardly of said roller chains, metal rods welded to the walls of said shields and adapted to bear against the rollers of said conveyors, and means for drawing said shields outwardly to bring said rods adjustably against said rollers.

ROY C. GADDIS.
LUTHER RAY GANN.

REFERENCES CITED

The following references are of record in the file of this patent:

UNITED STATES PATENTS

| Number | Name | Date |
|---|---|---|
| 559,370 | Dodge | May 5, 1896 |
| 2,274,313 | Whaley | Feb. 24, 1942 |
| 2,274,314 | Whaley | Feb. 24, 1942 |

FOREIGN PATENTS

| Number | Country | Date |
|---|---|---|
| 294,048 | Great Britain | July 19, 1928 |